United States Patent [19]

Beausoleil et al.

[11] 4,078,254
[45] Mar. 7, 1978

[54] HIERARCHICAL MEMORY WITH DEDICATED HIGH SPEED BUFFERS

[75] Inventors: William F. Beausoleil, Hopewell Junction; Byron E. Phelps, Poughkeepsie, both of N.Y.

[73] Assignee: International Business Machines Corporation, Armonk, N.Y.

[21] Appl. No.: 427,889

[22] Filed: Dec. 26, 1973

Related U.S. Application Data

[63] Continuation-in-part of Ser. No. 174,831, Aug. 25, 1971, abandoned.

[51] Int. Cl.² ............................................. G06F 13/00
[52] U.S. Cl. ............................................................ 364/900
[58] Field of Search ................................... 340/172.5

[56] References Cited

U.S. PATENT DOCUMENTS

| | | |
|---|---|---|
| 3,569,938 | 3/1971 | Eden et al. .......................... 340/172.5 |
| 3,581,291 | 5/1971 | Iwamoto et al. ................... 340/172.5 |
| 3,588,839 | 6/1971 | Belady et al. ...................... 340/172.5 |
| 3,618,040 | 9/1969 | Iwamoto et al. ................... 340/172.5 |
| 3,618,041 | 11/1971 | Horikoshi ........................... 340/172.5 |
| 3,685,020 | 8/1972 | Meade ................................ 340/172.5 |
| 3,693,165 | 9/1972 | Reiley et al. ....................... 340/172.5 |
| 3,735,360 | 5/1973 | Anderson et al. ................. 340/172.5 |
| 3,771,137 | 11/1973 | Barner et al. ...................... 340/172.5 |
| 3,786,427 | 1/1974 | Schmidt et al. ................... 340/172.5 |
| 3,889,237 | 6/1975 | Alferness et al. ................. 340/172.5 |

Primary Examiner—Joseph M. Thesz
Attorney, Agent, or Firm—Robert Lieber

[57] ABSTRACT

A hierarchical memory for a data processing system which is comprised of a number of different independent storage modules and a main memory backing store. Each data handling element of the system has an independent storage module associated with it as a dedicated buffer. A larger high speed main storage is used as a backing store. Each data handling element presumes that any data it needs is located in its dedicated buffer. If the data is not in the dedicated buffer, the data handling element scans all the other buffers until the desired data is located.

10 Claims, 10 Drawing Figures

INVENTORS
WILLIAM F. BEAUSOLEIL
BYRON E. PHELPS

BY *Owen Lamb*
ATTORNEY 4,078,254

HIERARCHICAL MEMORY WITH DEDICATED HIGH SPEED BUFFERS

CROSS-REFERENCE TO RELATED PATENT APPLICATION

This application is a Continuation-In-Part of application Ser. No. 174,831 filed Aug. 25, 1971 now abandoned.

BACKGROUND OF THE INVENTION

1. Field of the Invention

This invention relates to data processing systems and more particularly to a hierarchical memory employing a high speed backing store and several smaller lower speed buffer stores.

2. Prior Art

An article by C. J. Conti entitled "Concepts For Buffer Storage" published in the IEEE Computer Group News, March, 1969, describes a hierarchical memory in which a large slow speed three dimensional core storage operates in conjunction with a relatively small high speed buffer storage (or cache) manufactured using integrated circuit technology. By using the buffer/backing store arrangement, the central processing unit (CPU) is able to access data at a high rate from the high speed buffer which is matched more closely to the machine cycle of the CPU. When the CPU provides the address of desired information to the hierarchical memory, a control circuit determines whether or not the addressed data has been moved from the backing store to the buffer store. If the data is located in the buffer store, high speed access is possible from the buffer store to the CPU. If the data is not in the buffer store, controls move the data from the backing store to the high speed buffer and access is possible. A use algorithm is provided to insure that the most frequently used data is stored in the high speed buffer and the data most likely not to be used frequently is stored in the larger backing store. If the use algorithm is efficient, most accesses will be to the higher speed buffer store. This should result in a combined system having effective speeds approaching that of the fastest memory at a cost approaching that of the slowest and least expensive memory. Examples of hierarchical memories may be found in U.S. Pat. No. 3,588,829, Ser. No. 776,858, filed Nov. 14, 1968 which discloses separate and distinct memory modules and in U.S. Pat. No. 3,740,723 based upon Patent Application Ser. No. 101,658, filed Dec. 28, 1970 wherein an integrated hierarchical memory device is disclosed.

In the prior art, buffer/backing storage apparatus are transparent to the user and the buffer operation is under fixed hardware control. When a CPU initiates a fetch operation, the main storage address is presented to the memory hierarchy. Controls access the address search mechanism of the high speed buffer to determine if the requested address currently resides in the high speed buffer. If the requested information is in the buffer, it is immediately made available to the CPU. If the requested information is not currently in the buffer, a fetch operation is initiated to the main storage backing store. The buffer location to receive the information from main storage is determined by replacement logic which, in accordance with some predetermined algorithm determines which address in the buffer store is to returned to the backing store and replaced with the new data unit. When the fetch is initiated at the main storage, the exact word requested is first accessed and sent directly to the CPU and the buffer followed by the remaining words in the same transferrable data unit as determined by the particular block size of the system.

There are currently three methods in the prior art for handling store operations. The "store through" method is used on most existing systems and the data is always stored immediately in the main storage and the buffer address mechanism is checked to determine if the address block is currently in the buffer. In the block is in the buffer, the data is also stored in the buffer. However, on some systems, the buffer block is made invalid and any subsequent fetches to the same block require accessing the main storage to fetch the data to the buffer.

A second method is the "store wherever". In this method, the buffer address mechanism is checked to determine if the address block is currently in the buffer. If the block is in the buffer, the data is stored directly into the buffer without further action. If the block is not in the buffer, the data is stored in the main storage.

The third method "store in buffer" brings the block from main storage and then stores the new data into the block and the buffer.

In most existing systems, input/output data transfers access the main storage directly. Input operations are similar to those described for the store through operations from the CPU. That is, the block is stored into if it is currently in the buffer. It is possible, however, to utilize the scheme wherein the block is invalidated or deleted from the buffer when the addressed memory area in main storage is stored into from the I/O.

The prior art systems have some serious drawbacks. There is interference between CPU and input/output channels accessing the same main storage. That is, when a CPU accesses data in a common buffer, its data accessing has an effect on the use algorithm and therefore is a factor in determining what data is brought from the backing store into the buffer. In systems where the channels operate through the same buffer as the CPU, the channels interfere with the use logic and also have an effect on what data is stored in the buffer. Therefore, the CPU's and the channels interfere with each other and each is a factor in determining what data is stored in the buffer.

It is therefore an object of this invention to provide a hierarchical memory system in which CPU's and channels operate in an overlapped manner without interference.

It is also an object of this invention to provide a hierarchical memory system in which buffers are dedicated to certain data handling functions to provide a means for performing said functions without interference.

The above objects are accomplished in accordance with the present invention by providing separate independently operable high speed buffers dedicated to separate partitionable data handling tasks and matched in speed and/or page (data-unit) size to the tasks. The dedicated buffers all operate in conjunction with a large low speed main storage. Any user first tries to access its own dedicated buffer. If the required data unit is found in the user's dedicated buffer, the user accesses the information updating the use code for each use. If the required data unit is not in the dedicated buffer, a simultaneous search for the data is started on all other buffers. If the required data unit is found in some other buffer, the user accesses the data from that buffer but the use code for the buffer is not changed. The data unit in main storage is ignored, and the user's dedicated buffer is not altered.

If the desired data unit is not found in any of the buffers, the address is accessed in main storage and the least recently used data unit from the user's dedicated buffer is returned to its appropriate location in main storage. The requested data unit is transferred from main storage to the user's dedicated buffer and is stored with its address in the location vacated by the least recently used data unit.

This system has the advantage that data handling tasks such as problem programs, supervisor programs, and I/O programs can be performed independently and in an overlapper manner without interference with each other.

The foregoing and other objects, features and advantages of the invention will be apparent from the following more particular description of a preferred embodiment of the invention, as illustrated in the accompannying drawings.

In the Drawings

Figure 1A:
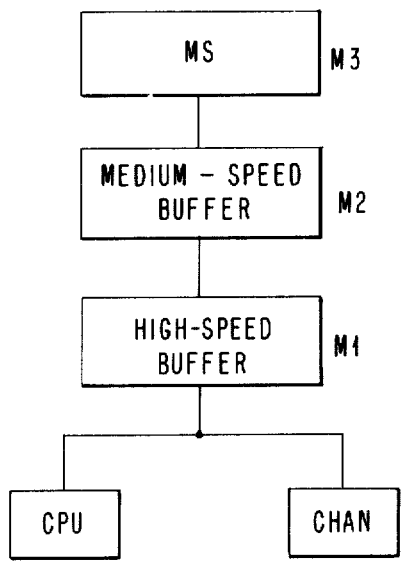
FIG. 1A depicts the prior art.
Figure 1B:
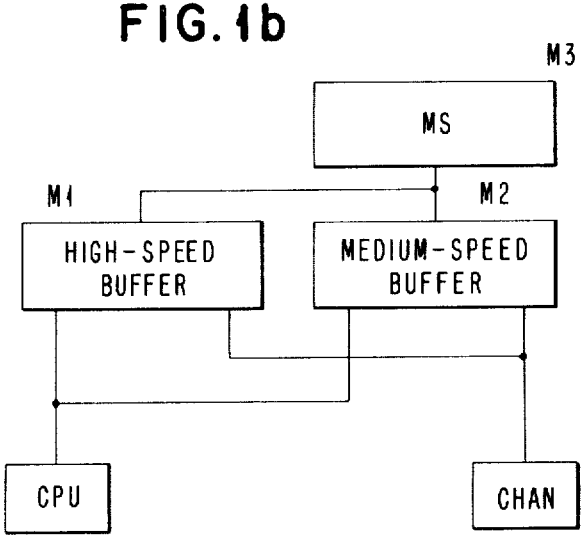
FIGS. 1B–1D are block diagrams of three embodiments of the invention.
Figure 1C:
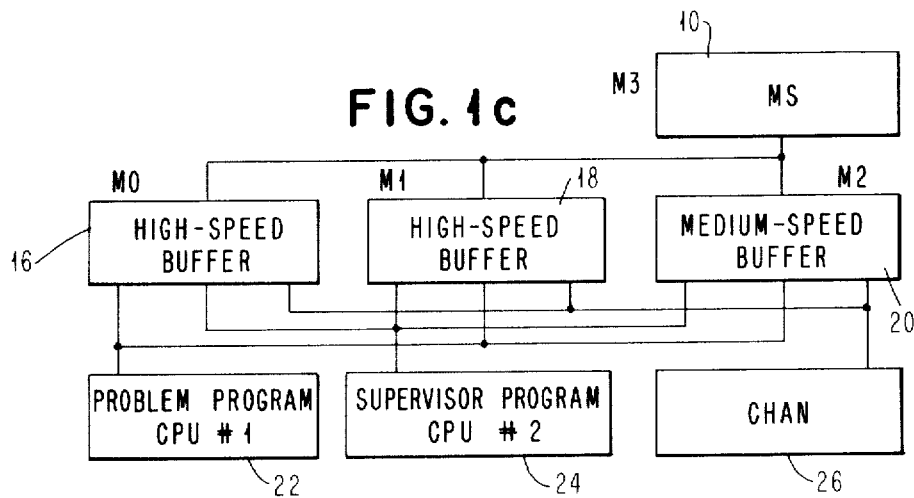
Figure 2A:
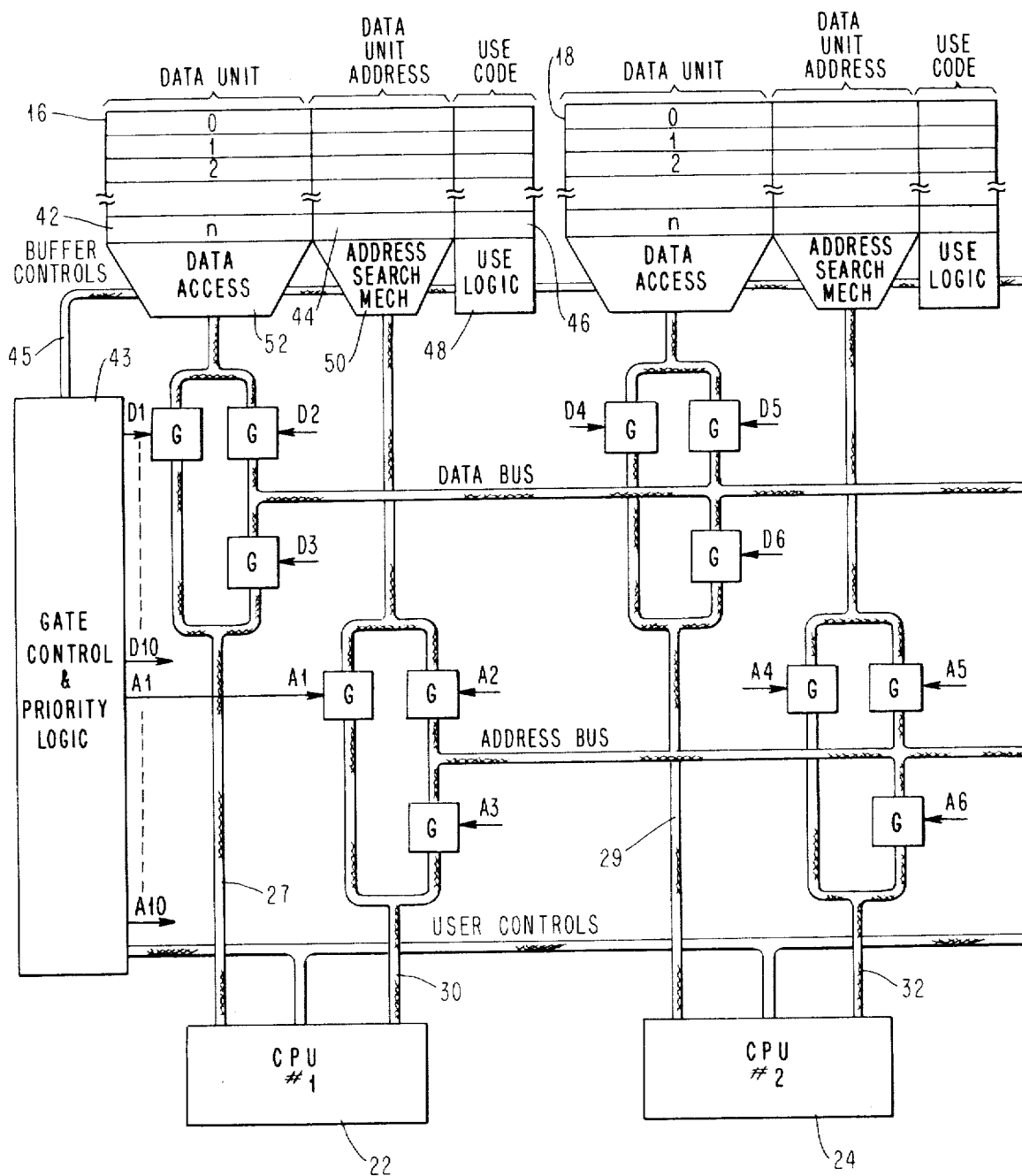
Figure 2B:
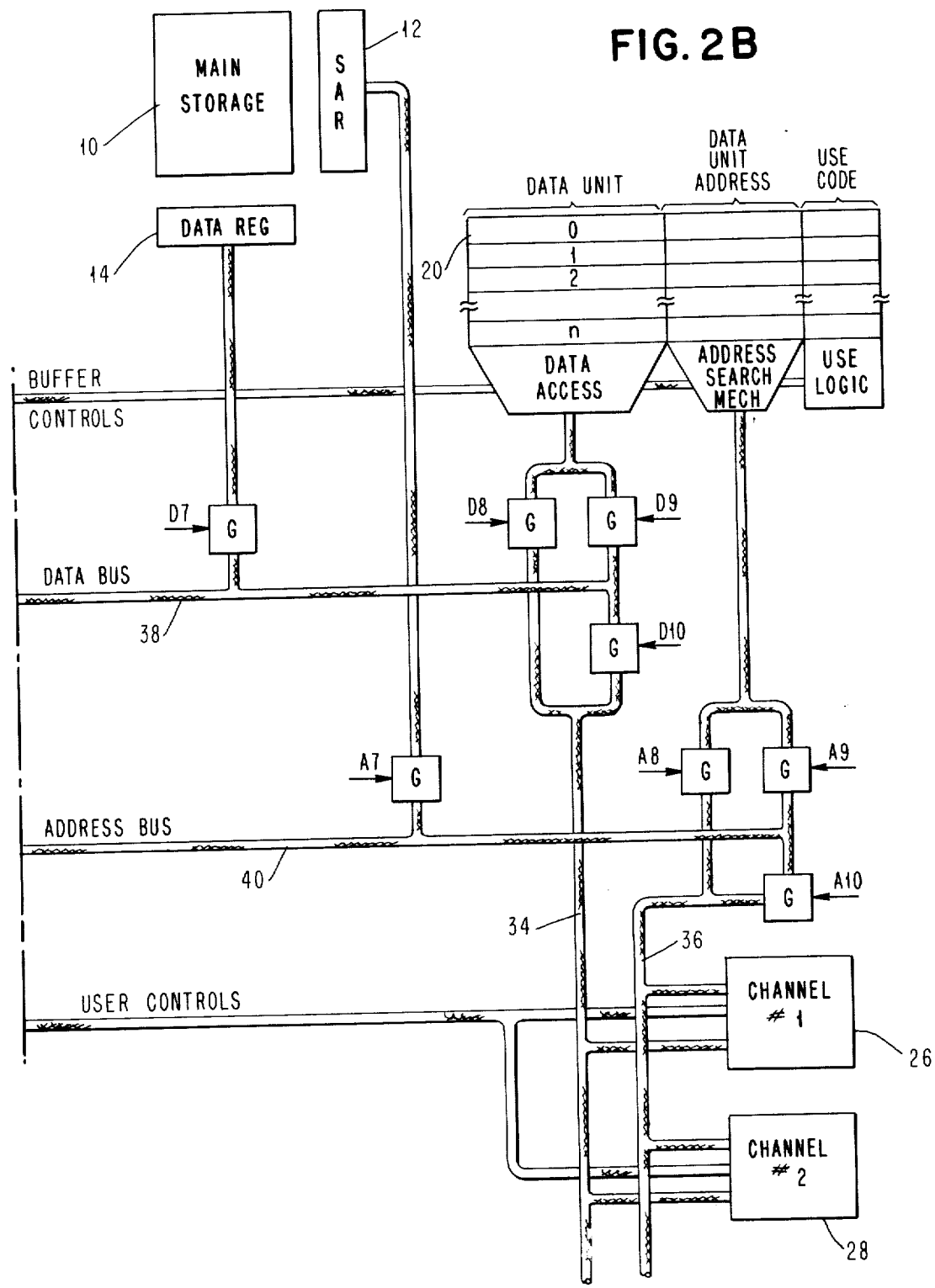
Figure 3:
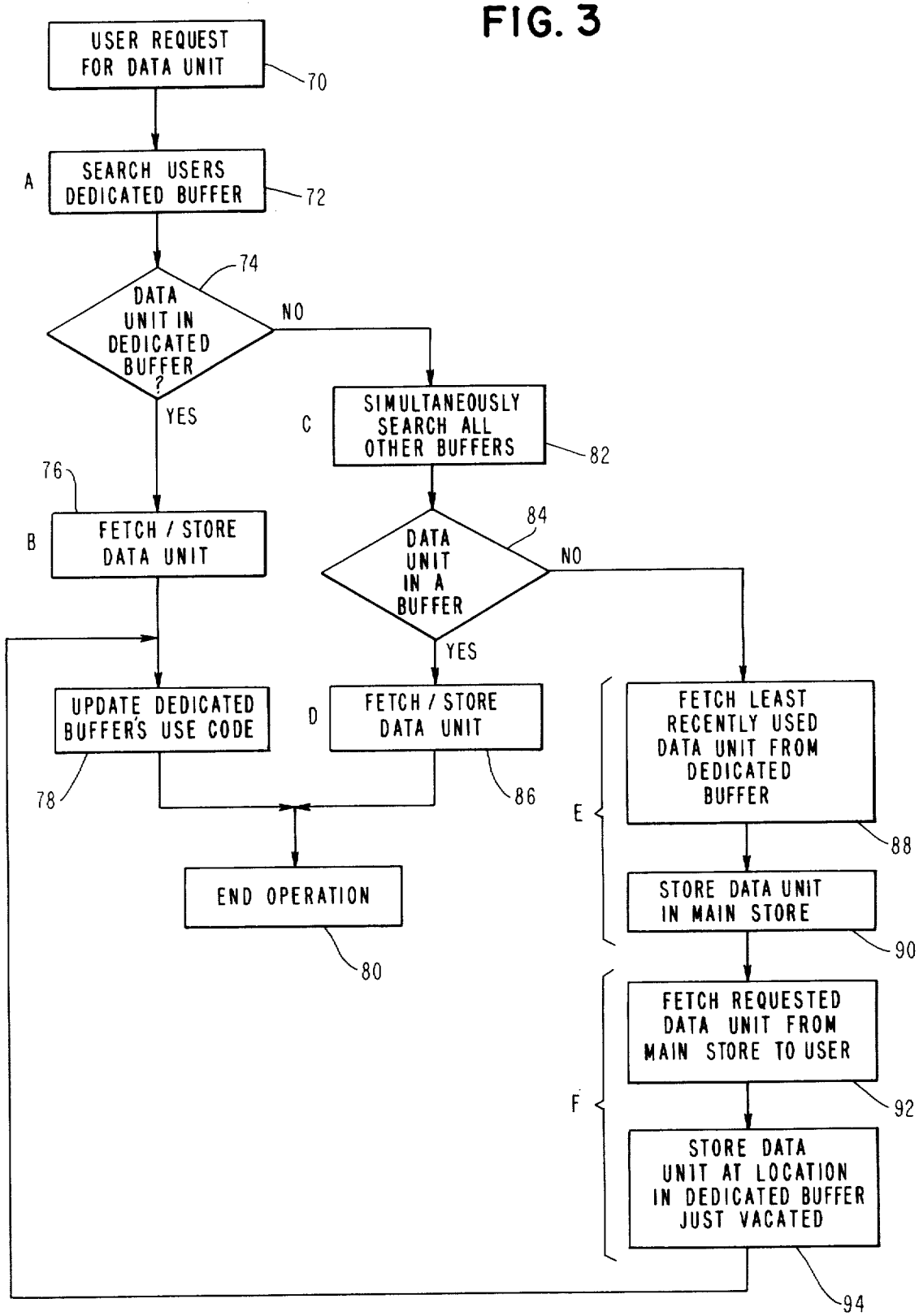
Figure 4:
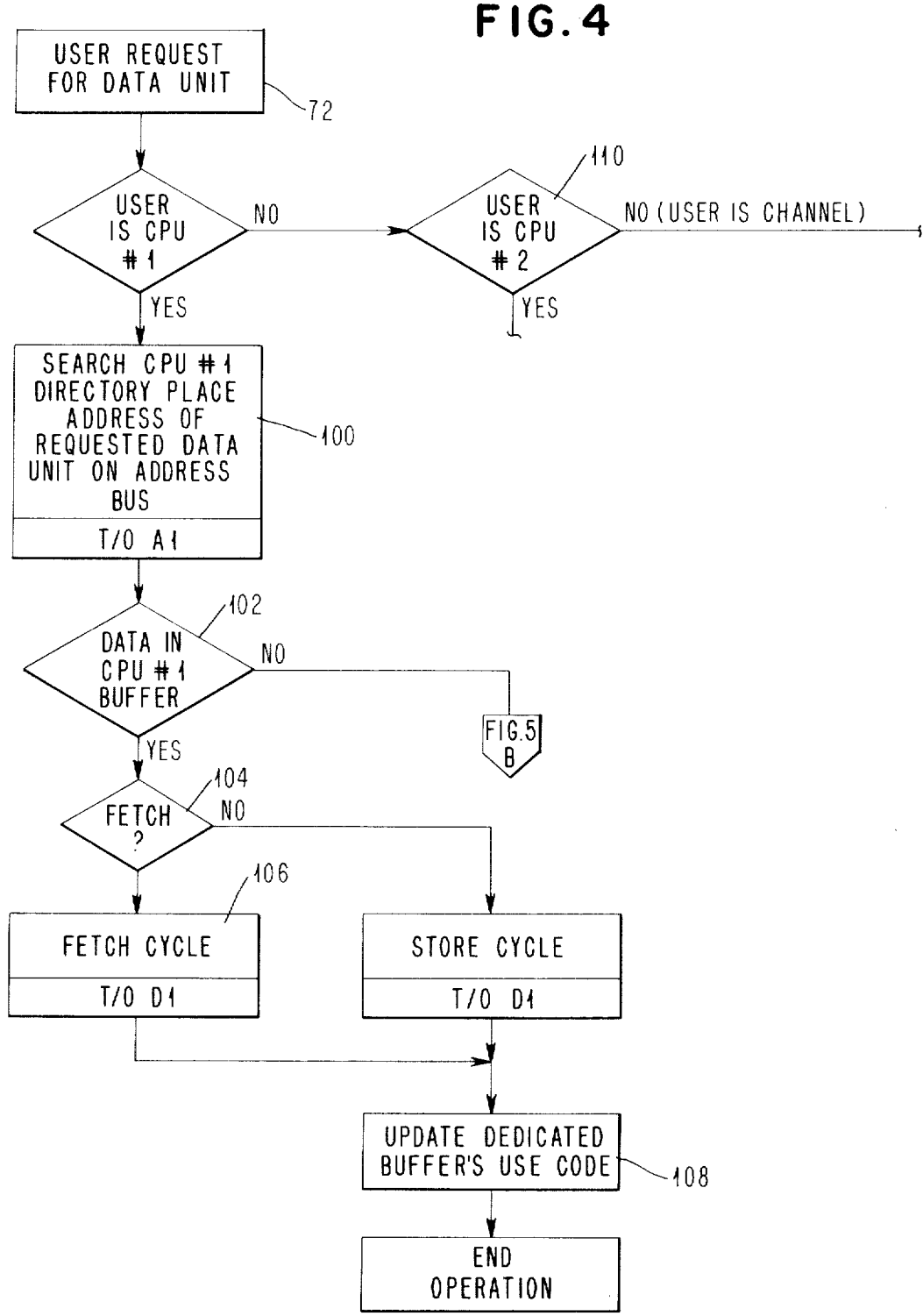
Figure 5:
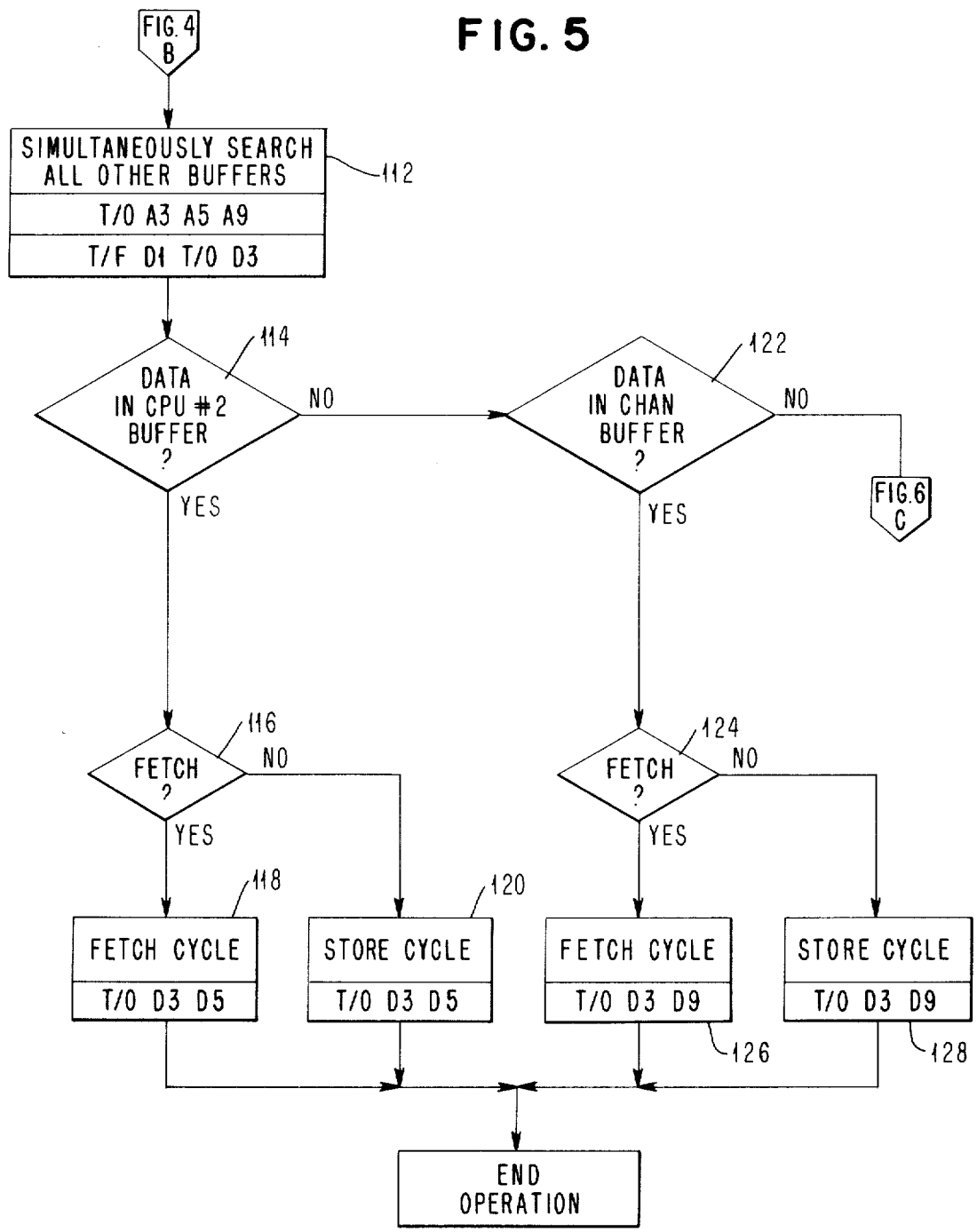
Figure 6:
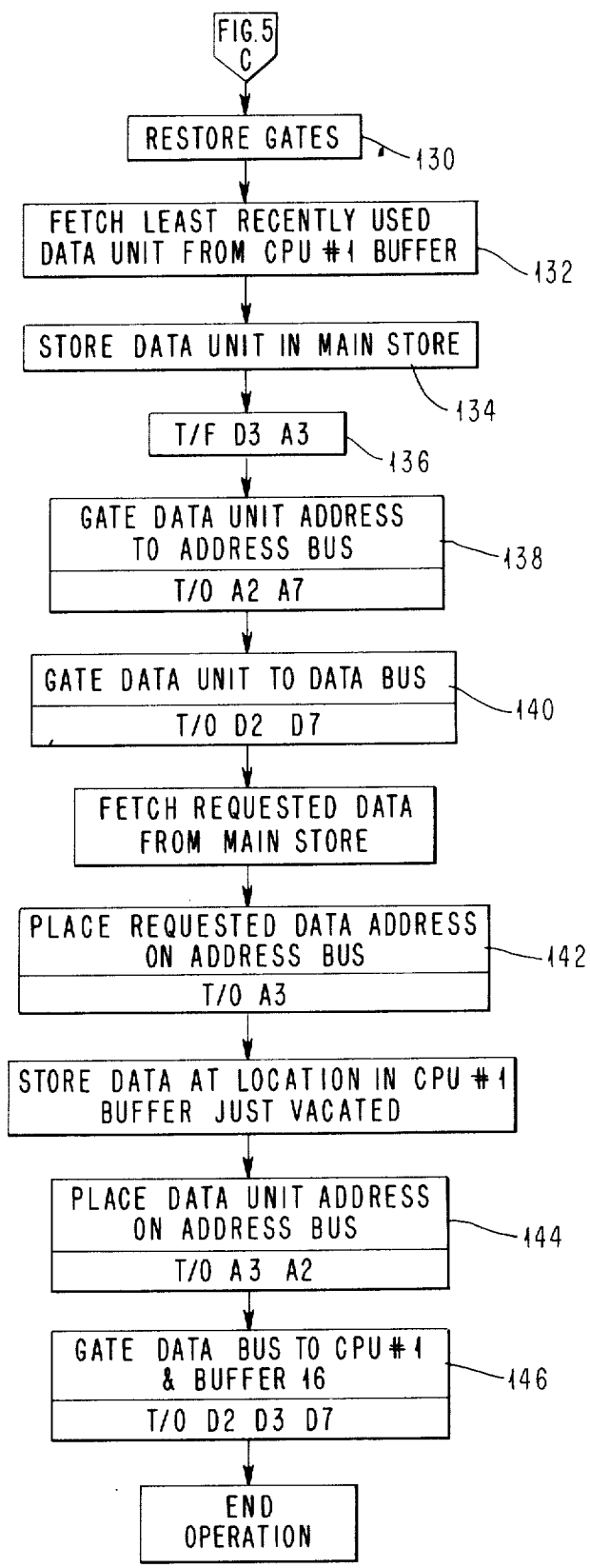

FIGS. 2A and 2B comprise a composite of the hierarchical memory system of FIG. 1C in which the invention is embodied;

FIG. 3 is a flowchart of control logic for controlling the system of FIGS. 2A and 2B;

FIGS. 4, 5 and 6 comprise a more detailed flowchart representation of the control logic for controlling the system of FIGS. 2A and 2B.

GENERAL DESCRIPTION

Referring now to FIG. 1A, a memory hierarchy typical of the prior art is illustrated. The hierarchy includes a main storage (MS), a medium-speed buffer and a high-speed buffer. All data movements go through the high-speed buffer M1. Therefore, only one user, a channel or CPU, can access the hierarchy at one time. When the CPU initiates a fetch operation, the address of the desired data is presented to the memory hierarchy. The high-speed buffer M1 is searched to determine if the requested address currently resides in the high-speed buffer. If the requested information is in the high-speed buffer, it is immediately available to the CPU. If the requested information is not in the high-speed buffer, the request goes to the medium-speed buffer M2. If the data is in M2, it is transferred to M1 and from M1 to the requesting CPU. If the data is not in M2, the request goes to the main storage M3. The data is transferred from M3 to M2 to M1 to the CPU. This approach has the disadvantage that all accesses to the backing store MS must go through two buffers in the memory hierarchy.

One embodiment of the present invention is shown in FIG. 1B. It differs from the prior art approach shown in FIG. 1A in that the channel directly accesses the medium-speed buffer M2 without going through the high-speed buffer M1. Data to and from the backing store MS is passed to the CPU only through the high-speed buffer and not through the medium-speed buffer M2. A channel and the CPU can both access their respective buffers simultaneously except for the occasional interference when both require access to the backing store MS or to the other buffer. When the data is not in the buffer dedicated to the requesting unit, both the backing store MS and the other buffer are immediately scanned. This takes advantage of the fact that a very high percentage of the time the required data is in the buffer dedicated to the requesting device. Therefore, the other buffers are only scanned on an exception basis; that is, after ascertaining that the data is not in the dedicated buffer.

The same data unit may exist in M2 and M3 or in M1 and M3 at the same time. In that case, the data in M1 or M2 may be more current than the copy in M3. The same data will not exist in buffers M1 and M2 at the same time.

By way of example, in FIG. 1B, the CPU accesses the high-speed buffer M1. If the data is not in M1, the request goes to M2 and M3. If the data is in M2, it is transferred to the CPU without altering the use mechanism associated with the buffer M2. If the data is not in M2, the data is transferred from the backing store M3 to the high-speed buffer M1 and from M1 to the CPU.

In a similar manner, the channels access the medium-speed buffer M2 for data. If the data is not found in M2, the request goes to M1 and M3. If the data is in M1, it is transferred to the channel without altering the use mechanism for high-speed buffer M1. If the data is not in M1, the data is transferred from the backing store M3 to the medium-speed buffer M2 and from M2 to the channel.

A second embodiment of the invention is shown in FIG. 1C. This embodiment is shown in more detail in FIGS. 2A and 2B, described subsequently. In FIG. 1C, the CPU functions are split. CPU number 1 handles problem programs and CPU number 2 handles supervisor programs and functions. Supervisor data and problem program data are always independent, the problem program CPU number 1 never needs access to high-speed buffer M1 (dedicated to CPU number 2) and the supervisor CPU number 2 never needs access to M0 (dedicated to problem program CPU number 1).

Data required by the problem program CPU not found in M0, will be found in M2 (medium-speed buffer) or M3 (the main storage or backing store). Data never flows from the channels directly to high-speed buffer M0.

In operation, the problem program CPU number 1 goes to M0 for data. If the data is not found in M0, the request goes to M2 and M3 simultaneously. If the data is found in M2, the data is transferred from M2 to CPU number 1. If the data is not in M2, the data is taken from the backing store M3 to the high-speed buffer M0 and from M0 to CPU number 1.

Requests from supervisor CPU number 2 go to high-speed buffer M1 for data. If the data is not found in M1, the request goes to M2 and M3 simultaneously. If the data is found in M2, the data is transferred from M2 to CPU number 2. If the data is not found in M2, the data is taken from the backing store M3 to the buffer M1 and from M1 to the supervisor CPU number 2.

Requests from the channel go to medium-speed buffer M2 for data. If the data is not found in M2, the request goes to M1 and M3. If the data is found in M1, the data is transferred from M1 to the channel without altering the use mechanism for the high-speed buffer M1. If the data is not found in M1, the data is taken from M3 to M2 where it replaces the least recently used data. The data is also transferred to the channel.

Figure 1D:
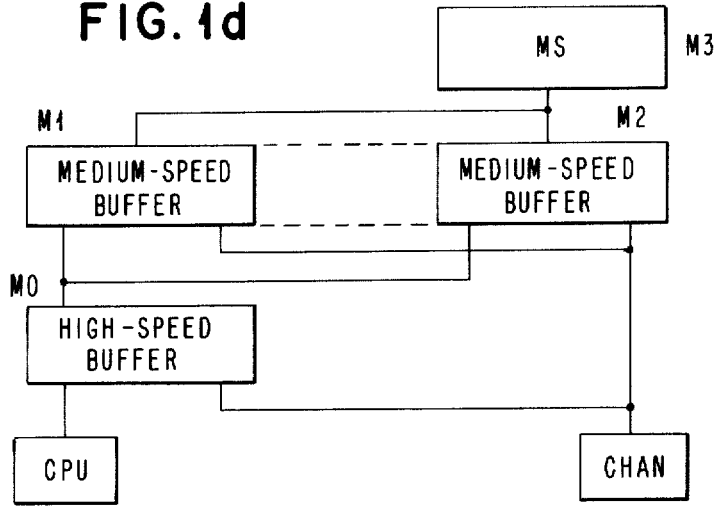

A third embodiment of the invention (FIG. 1D) utilizes three levels of buffering to the CPU to thereby more nearly match the high data rates of the CPU with respect to the channel. The approach is similar to that shown in FIG. 1B except that a high-speed buffer M0 is utilized. M0 has a much faster memory access time than the buffer M1 or the buffer M2. The buffers M1 and M2 may be physically combined and partitioned logically as illustrated by the brokenn lines.

DETAILED DESCRIPTION

The invention is described with reference to well known computer elements utilized in large scale computers having a memory hierarchy, for example, the IBM System/360 Model 195, described in the following IBM Field Engineering Manuals: Theory of Operation, System/360 Model 195, Storage Control Unit, Buffer Storage, Form No. SY22-6850 and Field Engineering Maintenance Diagrams Manual (FEMDM) System/360 Model 195, Volume 3, Storage Control Unit, Processor Storage, BSM Analyzer, Form No. SY22-6853-1, copies of which may be obtained by contacting an IBM Branch Office.

Referring now to FIG. 2A, a relatively large, slow, low cost main storage 10, similar to the processor storage of the above-identified Model 195, is provided in which data units (a record or block of records) are stored. Any single movement of data to or from the main storage 10 comprises one data unit. Data units are the smallest addressable unit of main storage. The main storage is addressed by a storage address register 12 (similar to the buffer storage of the Model 195) and data to be stored therein is stored in a data register 14 (similar to the storage bus in latch of the Model 195).

Buffers 16, 18 and 20 are relatively small, fast memories (similar to the buffer storage of the Model 195) each of which is dedicated to a user: a CPU 22, 24 or a channel string 26, 28; and matched in speed and page size to the user. Each buffer holds a number (n) of data units with their associated main storage address and a record of their most recent use by their associated CPU or channel string. Any given data unit may exist in only one buffer at any one time. It may or may not be simultaneously reproduced in main storage but accesses will always be to the version stored in a buffer.

The CPU's 22 or 24 are similar to the Central Processing Element of the Model 195 and the channels 26, 28 are similar to the IBM 2860, 2870 or 2880 channels, described in the above identified Model 195 manuals, and manuals referenced therein.

The CPU's 22, 24 are attached to their respective buffers over a data bus 27, 29 and an address bus 30, 32. Similarly, the data channels 26 and 28 are attached to the system by means of a data bus 34 and an address bus 36. Appropriate gates G are provided throughout the system. A common data bus 38 attaches the channels and CPU's to the main storage 10 and a common address bus 40 provides a connection between the storage address register 12 and the CPU's and channels of the system. Gate control and priority logic 43 is provided to interlock the various gates G to prevent two different users from addressing the same buffer at the same time, and to assign the common main memory and addresses busses in accordance with a predetermined priority when needed by more than one user. The gate control logic provides outputs D1 – D10 for controlling various gates associated with the data bus path of the system. Outputs A1 – A10 are provided for controlling the various gates associated with the address bus connecting the various elements of the system.

The buffers 16, 18 and 20 are identical in structure. However, in a preferred embodiment of the invention, buffer 20 is slower than buffers 16 and 18 since the channels do not require the high speeds required by the CPU's. Each buffer (for example, buffer 16) holds some number n of data units 42. Stored with each data unit is its main storage address 44, and a use code 46. The use code is established by means of some suitable use logic 48 which indicates which data unit is the least recently used. The logic computes and stores the use code, which indicates age of use, for each data unit as it is accessed. When replacement is required (that is, when the required data unit is in main storage and must be brought out to the buffer), the logic indicates which data unit is the least recently used. The use logic 48 is similar to the chronology array (CA) of the Model 195.

An address search mechanism 50 is provided for determining if the required data is stored in the buffer and if it is, the search mechanism indicates its location to the data access mechanism 52. When replacement takes place, the address of the required data unit is stored in the location of the least recently used data unit after that data unit has been returned to main storage and the required data unit is fetched from main storage to that location. The address search mechanism also signals the gate control logic 43 when the data unit required by the user is not in the buffer, and signals the buffers availability for use by other users. The address search mechanism 50 is similar to the data directory (DD) of the Model 195.

The data access mechanism 52 includes means for fetching or storing a data unit from or to the buffer location indicated by the address search mechanism for the use logic. The data access mechanism 52 is similar to the buffer storage and associated controls of the Model 195.

Briefly, referring to FIG. 3, a fetch or store data access operates as follows:

A. Any user (block 70), a CPU or a channel, first attempts to access its dedicated buffer for the desired data unit (block 72).

B. If the requested data unit is in the user's buffer (decision block 74 YES), the user fetches or stores into the buffer location (block 76) updating the use code (block 78) for each use. The operation is then ended (block 80).

C. If the requested data unit is not in the dedicated buffer (decision block 74 NO), a simultaneous search is started of all other buffers (block 82).

D. If the requested data unit is in some other buffer (decision block 84 YES), the user accesses the data from that buffer but the use code for that buffer is not altered (block 86). The data unit in main storage is ignored, and the user's buffer is not changed.

E. If the requested data unit exists only in main storage (decision block 84 NO), the least recently used data unit from the user's buffer is returned to its location in main storage.

F. The requested data unit is transferred from main storage to the user and to the user's buffer (block 92) and is stored with its address in the location vacated in Step E (block 94).

The following three possibilities are described in detail in the following paragraphs (1) each user's desired data unit is in its respective dedicated buffer; (2) the requested data unit resides in another buffer; and (3) the requested data unit resides only in main store.

1. Each user's desired data unit is in its respective dedicated buffer.

Since, for a high percentage of the time, data units required by the CPU's and the channels reside in their respective dedicated buffers, the normal position of data gates D1, D4 and D8 and address gates A1, A4 and A8 is closed and all other data and address gates are open. (Address and data gates G are referred to by means of the input control lines D1 - D10 and A1 - A10, respectively.)

In the normal mode, any CPU or channel can directly communicate with its own dedicated buffer without interfering with or interference from any other CPU or channel. Only one channel 26, 28 can address the channel buffer 20 at any one time.

For example, at block 100, FIG. 4, CPU number 1 sends the address of a desired data unit through normally closed address gate A1 to address search mechanism 50. The address search mechanism finds (yes output block 102) that the address is present in the buffer 16 and sends the data (fetch yes block 104) through the data access mechanism 52 and data gate D1 to the data bus 27 of CPU number 1 (block 106). At the same time, the use logic 48 notes the use of that data unit and updates the use code, block 108. In a similar manner, the CPU number 2 and the channels 26, 28 access their own dedicated buffers 18 and 20, block 110.

2. The requested data unit resides in another buffer.

Assume, in the above example, that CPU number 1 does not find the requested data unit in its own buffer 16 (no output block 102). In this event, the search mechanism 50 does not find a required data unit address within the buffer 16 and sends an appropriate signal to the gate control logic 43.

The gate control logic checks the main data and main address busses 38, 40. When these busses are available in accordance with a predetermined priority (refer to block 112, FIG. 5), the gate controls 43 close address gate A3 to thereby place the address of the required data unit on the main address bus 40. The control logic 43 also de-energizes data gate D1 and energizes data gate D3 in preparation for data entry into CPU number 1.

The priority control logic 43 checks the address search mechanism of the other buffers 18, 20 to ascertain if they are free. When each is free, the gate control logic 43 opens and closes the appropriate address gates (A5 and A9) to present the requested data address to the respective address search mechanism of the buffers 18 and 20 (block 112). This may or may not take place concurrently depending on whether or not the other buffers are free.

To continue with the above example, assume that the required data unit resides in buffer 18. CPU number 2 buffer, decision block 114, yes path. If the address search mechanism of buffer 18 finds the requested address, it signals the gate control logic 43 which then closes data gate D5 so that the required data unit is sent to CPU number 1 via the data access mechanism of buffer 18 (blocks 118 or 120, depending upon whether fetch or store operation, block 116). The use code of buffer 18 is not changed. As soon as CPU number 1 receives the required data unit, the gate control logic 43 restores all data and address gates to the normal position.

Note that if buffer 20 (channel buffer) contains the required data unit instead of buffer 18, the gate control logic controls the gates associated with buffer 20 in a manner which is similar to that just described for buffer 18 (see FIG. 5, block 122).

3. The requested data unit resides only in main store.

Assume, in the above example, that CPU number 1 does not find the requested data unit in its own buffer 16 nor does it find the data unit in buffers 18 or 20, i.e., decision 122 is no. In that event, the data unit must reside in main storage 10.

Referring to FIG. 6, the gate control logic 43, after receiving a signal from a buffer indicating that the data unit does not reside in that buffer, restores the buffer and its gates to the normal setting block 130. When all buffers have returned signals indicating that the data unit does not reside therein, the gate control logic 43 signals the buffer 16. In response to this signal, the address search mechanism 50 and data access mechanism 52 place the least recently used data unit and its address on the data bus and the address bus block 132. (Note that gates D2 and A2 are energized from the previous operation so that the data and address are placed on the respective data and address busses 38 and 40.) The transfer of the data unit to main store makes room for the requested data unit to be transferred from main storage to the data buffer and to the requesting user, in this case CPU number 1.

The gate control logic 43 de-energizes D3 and A3, block 136, to isolate CPU number 1 from the data and address bus. Gates D1 and A1 remain energized from the previous operation. The gate control logic also energizes D2, A2, D7 and A7 (blocks 138, 140). This completes a data and address path from the buffer 16 to the main store 10. Buffer 16 places the address of the least recently used data unit on the data bus where it is transmitted to main storage through gates A2 and A7 block 138. The least recently used data unit corresponding to that address is placed on the data bus, block 140, through data gates D2 and D7 where it is stored at the address transmitted therewith.

At the completion of the store operation, the gate control logic 43 energizes address gate A3 (block 142) thereby placing the address of the requested data unit from CPU number 1 on the main address bus where it is transmitted via gate A7 (previously energized) to the main storage address register. This address locates the requested data unit in main storage and also is transmitted through previously energized address gate A2 to buffer 16 to become the new address in the location previously occupied by the least recently used data unit.

At the same time, the gate control logic energizes data gate D3 (block 146) so that the requested data unit placed on the data bus by main storage via gate D7 is transmitted directly to CPU number 1 via data gate D3 and also to buffer 16 via data gate D2 to replace the previously vacated least recently data unit in the data location specified by the address.

At the conclusion of this operation, the gate control logic restores all data and address gates to the normal condition.

While the invention has been particularly shown and described with reference to a preferred embodiment thereof, it will be understood by those skilled in the art that various changes in form and detail maybe made therein without departing from the spirit and scope of the invention.

What is claimed is:

1. For use with a data processing system, a hierarchical memory comprising:

a backing store having data units stored therein at memory addresses;

a first buffer dedicated to a first user of said hierarchical memory;

a second buffer dedicated to a second user of said hierarchical memory;

bus/gating means interconnecting said first user, said second user, said first buffer, said second buffer, and said backing store;

means responsive to a request for a data unit from said first user for searching said first buffer for said data unit and for controlling said bus/gating means to thereby transfer said data unit between said first buffer and said first user upon the condition that said data unit resides in said first buffer, and means for searching said second buffer for said data unit upon the condition that said requested data unit is not found in said first buffer and for controlling said bus/gating means to thereby transfer said data unit between said second buffer and said first user upon the condition that said data unit resides in said second buffer.

2. The combination according to claim 1 further comprising means for searching said backing store for said data unit upon the condition that said data unit is not found in said first or said second buffer.

3. The method of searching a hierarchical memory which comprises a backing store, a first buffer dedicated to a first user of said hierarchical memory, and a second buffer dedicated to a second user of said hierarchical memory, comprising the steps of:

searching the dedicated buffer of said first user for a data unit requested by said user;

searching the dedicated buffer of said second user upon the condition that the requested data unit does not reside in the dedicated buffer of said first user; and accessing the data unit at said second dedicated buffer upon the condition that said data unit is found in said second buffer without alteration of the use code of said first dedicated buffer.

4. The method according to claim 3 comprising the further step of transferring the least recently used data unit from said first user's dedicated buffer to its appropriate location in said backing store upon the condition that the requested data unit is not found in either of said dedicated buffers, to thereby vacate a location in said buffer, and transferring the requested data unit from said backing store to said first user and to first dedicated buffer to be stored in its address in said location vacated in said dedicated buffer.

5. For use with a data processing system, a hierarchical memory comprising:

a backing store having data units stored therein at memory addresses;

a first buffer dedicated to a first user of said hierarchical memory, said buffer including use logic for assigning a use code to each data unit stored in said buffer;

a second buffer dedicated to a second user of said hierarchical memory;

bus/gating means interconnecting said first user, said second user, said first buffer, said second buffer, and said backing store;

control means responsive to a request for a data unit from said first user for searching said first dedicated buffer for said data unit and for controlling said bus/gating means to thereby transfer said data unit between said buffer and said first user upon the condition that said data unit resides in said first buffer, and means at said buffer for updating said use code assigned to said data unit upon each transfer; and means for searching said second buffer for said data unit upon the condition that said requested data unit is not found in said first buffer.

6. The combination according to claim 5 further comprising means for searching said backing store for said data unit upon the condition that said data unit is not found in said first or said second buffer.

7. For use with a data processing system, a hierarchical memory comprising:

a slow speed backing store having data units stored therein at memory addresses;

a first high speed buffer dedicated to a first user of said hierarchical memory;

a second high speed buffer dedicated to a second user of said hierarchical memory;

bus/gating means interconnecting said first user, said second user, said first high speed buffer, said second high speed buffer, and said backing store;

means responsive to a request for a data unit from said first user for searching said first dedicated buffer for said data unit and for controlling said bus/gating means to thereby transfer said data unit between said buffer and said first user upon the condition that said data unit resides in said first buffer, and means for searching said second buffer for said data unit upon the condition that said requested data unit is not found in said first buffer.

8. The combination according to claim 7 further comprising means for searching said backing store for said data unit upon the condition that said data unit is not found in said first or said second buffer.

9. For use with a data processing system, a hierarchical memory comprising:

a slow speed backing store having data units stored therein at memory addresses;

a first high speed buffer dedicated to a first user of said hierarchical memory said buffer including use logic for assigning a use code to each data unit stored in said buffer;

a second high speed buffer dedicated to a second user of said hierarchical memory;

bus/gating means interconnecting said first user, said second user, said first high speed buffer, said second high speed buffer, and said backing store;

control means responsive to a request for a data unit from said first user for searching said first dedicated buffer for said data unit and for controlling said bus/gating means to thereby transfer said data unit between said buffer and said first user upon the condition that said data unit resides in said first buffer, and means at said buffer for updating said use code assigned to said data unit upon each transfer; and means for searchng said second buffer for said data unit upon the condition that said requested data unit is not found in said first buffer.

10. The combination according to claim 9 further comprising means for searching said backing store for said data unit upon the condition that said data unit is not found in said first or said second buffer.

* * * * *